US011005570B2

United States Patent
Lee et al.

(10) Patent No.: US 11,005,570 B2
(45) Date of Patent: May 11, 2021

(54) COHERENT OPTICAL RECEIVER AND FABRICATION METHOD THEREOF

(71) Applicant: ELECTRONICS AND TELECOMMUNICATIONS RESEARCH INSTITUTE, Daejeon (KR)

(72) Inventors: Seo Young Lee, Daejeon (KR); Young-Tak Han, Daejeon (KR); Jong-Hoi Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/846,948

(22) Filed: Apr. 13, 2020

(65) Prior Publication Data

US 2021/0044359 A1    Feb. 11, 2021

(30) Foreign Application Priority Data

Aug. 9, 2019   (KR) .......................... 10-2019-0097700

(51) Int. Cl.
*H04B 10/00*   (2013.01)
*H04B 10/61*   (2013.01)
*H04J 14/00*   (2006.01)

(52) U.S. Cl.
CPC ................................. *H04B 10/615* (2013.01)

(58) Field of Classification Search
CPC ....... H04B 10/60; H04B 10/61; H04B 10/614
See application file for complete search history.

(56) References Cited

U.S. PATENT DOCUMENTS

| 8,588,560 B2 | 11/2013 | Sakamaki et al. |
| 2005/0135728 A1 | 6/2005 | Sala et al. |
| 2009/0116835 A1 | 5/2009 | Kwon et al. |
| 2009/0237770 A1 | 9/2009 | Kim et al. |
| 2010/0142889 A1 | 6/2010 | Kwon et al. |

(Continued)

OTHER PUBLICATIONS

D. Dai et al., "Considerations for the Design of Asymmetrical Mach-Zehnder Interferometers Used as Polarization Beam Splitters on a Submicrometer Silicon-On-Insulator Platform", Journal of Lightwave Technology, vol. 29, No. 12, pp. 1808-1817, Jun. 15, 2011.

(Continued)

*Primary Examiner* — Daniel G Dobson
(74) *Attorney, Agent, or Firm* — Rabin & Berdo, P.C.

(57) ABSTRACT

Provided are a coherent optical receiver and a fabrication method thereof, the coherent optical receiver including a substrate, signal and local input waveguides extending in a first direction parallel to a top surface of the substrate and configured to receive an optical signal, a first optical circuit element including a first optical waveguide connected to the signal input waveguide and a trench provided in one side of the first optical waveguide in parallel to the first direction, a second optical circuit element including a second optical waveguide connected to the first optical waveguide, a slit crossing the second optical waveguide, and a wavelength plate inserted to the slit, and third optical circuit elements connected to the second optical circuit element, wherein the first to third optical circuit elements are monolithically integrated in the substrate.

20 Claims, 6 Drawing Sheets

(56) References Cited

U.S. PATENT DOCUMENTS

2012/0251041 A1* 10/2012 Ishikawa ............... G02B 6/124
            385/14
2013/0301976 A1   11/2013 Saida et al.
2013/0301977 A1   11/2013 Saida et al.
2016/0327738 A1   11/2016 Doerr et al.
2018/0136392 A1*   5/2018 Nagashima .......... G02B 6/0026

OTHER PUBLICATIONS

D. Gauden et al., "Variable optical attenuator based on thermally tuned Mach-Zehnder interferometer within a twin core fiber", Optics Communications 231, pp. 213-216, 2004.

Q. Wu et al., "Silicon thermo-optic variable optical attenuators based on Mach-Zehnder interference structures", Optics Communications 341, pp. 69-73, 2015.

Y. Hashizume et al., "Integrated polarisation beam splitter using waveguide birefringence dependence on waveguide core width", Electronics Letters, vol. 37, No. 25, pp. 1517-1518, Dec. 6, 2001.

Y. He et al., "Influence of thermal isolating grooves on the performance of the Mach-Zehnder interferometer-type thermo-optic variable optical attenuator", Optical Engineering, vol. 44, 040504, Apr. 2005.

Y. Nasu et al., "Temperature insensitive and ultra wideband silica-based dual polarization optical hybrid for coherent receiver with highly symmetrical interferometer design", Optics Express, vol. 19, No. 26, pp. B112-B118, Nov. 17, 2011.

* cited by examiner

US 11,005,570 B2

COHERENT OPTICAL RECEIVER AND FABRICATION METHOD THEREOF

CROSS-REFERENCE TO RELATED APPLICATIONS

This U.S. non-provisional patent application claims priority under 35 U.S.C. § 119 of Korean Patent Application No. 10-2019-0097700, filed on Aug. 9, 2019, the entire contents of which are hereby incorporated by reference.

BACKGROUND

The present disclosure herein relates to a coherent optical receiver and a fabrication method thereof, and more particularly, to a coherent optical receiver including a plurality of optical circuit elements integrated in a signal substrate and a fabrication method thereof.

In order to demodulate an optical signal in a coherent optical receiver, a light intensity is required to be constantly maintained irrelevant to a transmission distance so as to secure the linearity of the signal, and the signal is required to be separated according to the polarization and phase. Accordingly, a variable optical attenuator (VOA) for adjusting a light intensity, a polarization beam splitter (PBS) for demodulating polarization, and an optical hybrid (OH) for demodulating a phase are necessary. When elements having the functions are individually fabricated and then integrated, an individual component is to be separately fabricated and packaged, and thus the entire size of a module becomes large and a manufacturing cost increases. Accordingly, a structure and method for integrating the VOA, PBS, and the OH in a single substrate and efficiently implementing the same are being studied.

SUMMARY

The present disclosure provides a coherent optical receiver in which a variable optical attenuator, a polarization beam splitter, and an optical hybrid are integrated in a single substrate.

The present disclosure also provides a fabrication method of a coherent optical receiver, which integrates a variable optical attenuator, a polarization beam splitter, and an optical hybrid in a single substrate, and substantially simultaneously forms a trench in the variable optical attenuator and a slit in the polarization beam splitter.

The objectives of the present disclosure are not limited to the above-described. The objectives not mentioned in the above should be clearly understood by those skilled in the art from description below.

An embodiment of the inventive concept provides a coherent optical receiver including: a substrate; signal and local input waveguides extending in a first direction parallel to a top surface of the substrate and configured to receive an optical signal; a first optical circuit element including a first optical waveguide connected to the signal input waveguide and a trench provided in one side of the first optical waveguide in parallel to the first direction; a second optical circuit element including a second optical waveguide connected to the first optical waveguide, a slit crossing the second optical waveguide, and a wavelength plate inserted to the slit; and third optical circuit elements connected to the second optical circuit element, wherein the first to third optical circuit elements are monolithically integrated in the substrate.

In an embodiment, the trench and the slit may be configured simultaneously in a same process.

In an embodiment, depths of the trench and the slit may be larger than a thickness of the first optical waveguide and a thickness of the second optical waveguide.

In an embodiment, each of the depths of the trench and the slit may be about 50 μm to about 500 μm.

In an embodiment, the substrate may contain silicon, and the first and second optical waveguides may contain silica ($SiO_2$) or silicon nitride ($SiN_x$).

In an embodiment, the first optical waveguide may include first and second branch waveguides, wherein the first and second branch waveguides are separated from each other in a second direction perpendicular to the first direction, and the trench includes a center trench between the first and second branch waveguides and side trenches in outer sides of the first and second branch waveguides.

In an embodiment, the side trenches may be symmetric with respect to the center trench.

In an embodiment, the first optical circuit element may further include heating electrodes, wherein each of the heating electrodes overlaps the first branch electrode or the second branch waveguide in a direction vertical to the top surface of the substrate.

In an embodiment, widths of the heating electrodes in the second direction may be larger than or equal to widths of the first and second branch waveguides in the second direction.

In an embodiment, the slit may include: a first slit having a width that becomes larger in a second direction perpendicular to the first direction; a second side slit having a width that becomes larger in an opposite direction to the second direction; and a center slit perpendicular to the second optical waveguide between the first and second side slits, wherein the center slit has a first width in the first direction, the wavelength plate has a second width in the first direction, and the first width is larger than the second width.

In an embodiment, the first width may be about 8 μm to about 30 μm, and the second width may be about 5 μm to about 20 μm.

In an embodiment, the first to third optical circuit elements may be sequentially provided in the first direction, and the third optical circuit elements may be separated from each other in a second direction perpendicular to the first direction.

In an embodiment, the first and second optical circuit elements may be separated from each other in a second direction perpendicular to the first direction, and may have a crosspoint between the first optical waveguide and the second optical waveguide.

In an embodiment, a crossing angle between the first optical waveguide and the second optical waveguide at the crosspoint may be about 35 degrees to about 90 degrees.

In an embodiment, the wavelength plate may include a ½ λ wavelength plate (HWP) or a ¼λ wavelength plate (QWP).

In an embodiment of the inventive concept, a fabrication method of a coherent optical receiver, includes: providing a substrate; and providing first, second, and third optical circuit elements on the substrate, wherein the providing of the first optical circuit element includes providing a first optical waveguide and a trench in both sides of the first optical waveguide, and the providing of the second optical circuit element includes: providing a second optical waveguide and a slit crossing the second optical waveguide; and inserting a wavelength plate into the slit, wherein the providing of the trench of the first optical circuit element and the slit of the second optical circuit element includes:

providing an optical waveguide film on the substrate; and sequentially etching a portion of the optical waveguide film and a portion of the substrate, wherein the trench and the slit being provided simultaneously.

In an embodiment, the providing of the trench and the slit may be performed through at least any one process among an induced coupled plasma etching process and a deep reactive ion etching process.

In an embodiment, the first optical waveguide may include first and second branch waveguides, the trench may include a center trench between the first and second branch waveguides and side trenches in outer sides of the first and second branch waveguides, and the side trenches may be symmetric with respect to the center trench.

In an embodiment, the slit may be perpendicular to the second optical waveguide, and the wavelength plate may be inserted into the slit so as to be perpendicular to the second optical waveguide.

In an embodiment, the first and the second optical waveguides may be configured to cross at a crosspoint, and a crossing angle at the crosspoint may be about 35 degrees to about 90 degrees.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
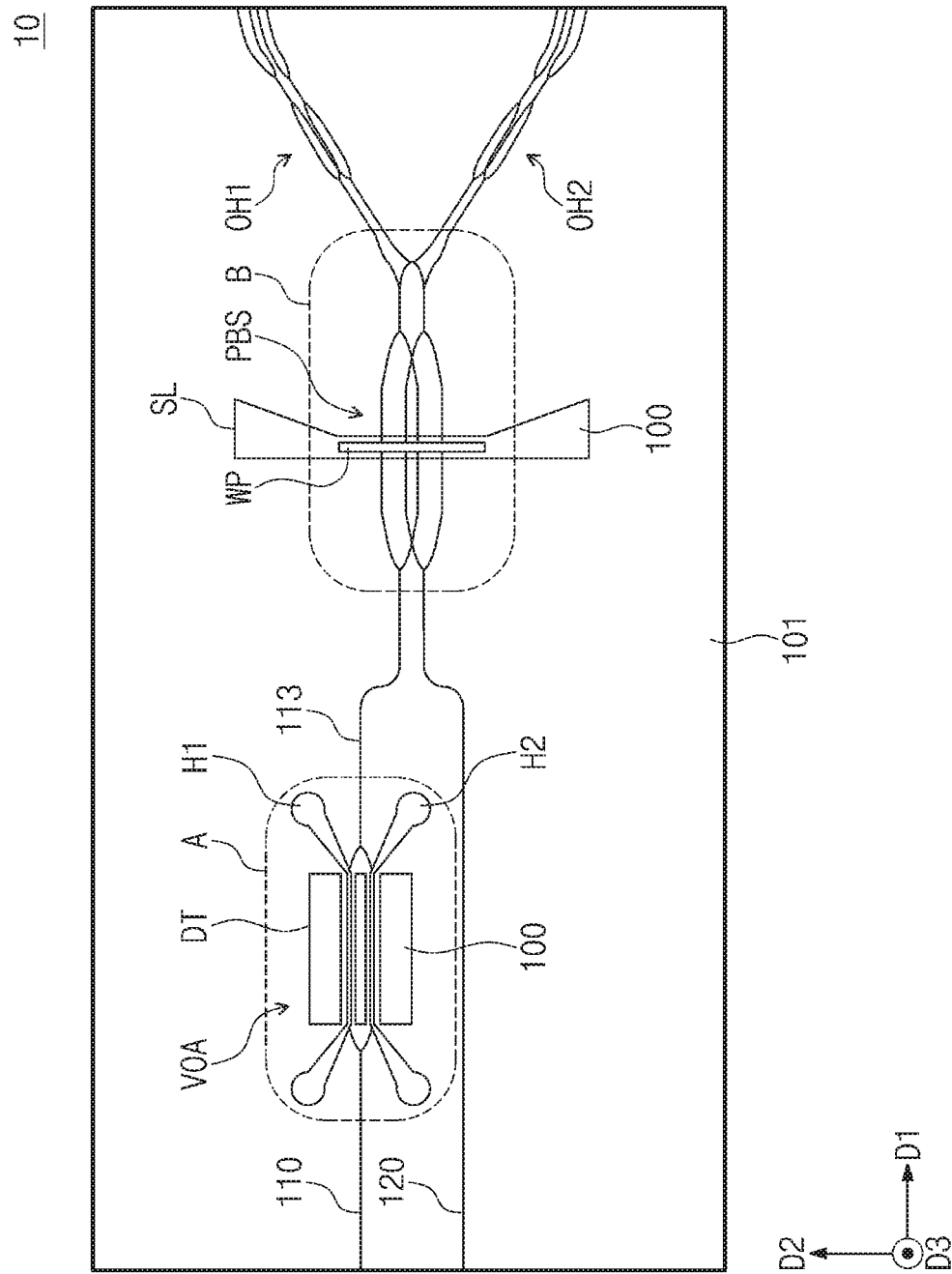
FIG. 1 is a plan view for explaining a coherent optical receiver and a fabrication method thereof according to an embodiment of the inventive concept.

The embodiments of the present disclosure will now be described with reference to the accompanying drawings for sufficiently understating a configuration and effects of the inventive concept.

However, the inventive concept is not limited to the following embodiments and may be embodied in different ways, and various modifications may be made thereto. The embodiments are just given to provide complete disclosure of the inventive concept and to provide thorough understanding of the inventive concept to those skilled in the art. In the accompanying drawings, the sizes of the elements may be greater than the actual sizes thereof, for convenience of description, and the scales of the elements may be exaggerated or reduced.

The terminology used herein is for the purpose of describing particular embodiments only and is not intended to limit the scope of the present disclosure. Unless otherwise defined, all terms used herein have the same meaning as commonly understood by one of ordinary skill in the art to which this invention pertains.

As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

It will be understood that, in the present specification, when a layer is referred to as being "on" another layer, it may indicate that the layer is directly on the other layer or that another layer(s) is present therebetween.

Although the terms first, second, third etc. may be used herein to describe various regions, and films (or layers) etc., the regions and films (or layers) are not to be limited by the terms. The terms may be used herein only to distinguish one region or layer) from another region or layer. Therefore, a part referred to as a first part in one embodiment can be referred to as a second part in another embodiment. An embodiment described and exemplified herein includes a complementary embodiment thereof. Like reference numerals refer to like elements throughout.

Hereinafter, embodiments of a coherent optical receiver according to the present disclosure and a fabrication method thereof will be described in detail with reference to drawings.

FIG. 1 is a plan view for explaining a coherent optical receiver and a fabrication method thereof according to an embodiment of the inventive concept.

Referring to FIG. 1, the coherent optical receiver 10 may include a substrate 100, and an optical waveguide film 101 on the substrate 100. The substrate 100 and the optical waveguide film 101 may have a planar type extending in a first direction D1 and a second direction that is perpendicular to the first direction D1. The top surfaces of the substrate 100 and the optical waveguide film 101 may be perpendicular to a third direction D3 that is perpendicular to the first direction D1 and the second direction D2. The thickness of the substrate 100 in the third direction D3 may be larger than that of the optical waveguide film 101 in the third direction D3. The substrate 100 may be, for example, a silicon (Si) substrate. The optical waveguide film 101 may include, for example, silica $SiO_2$ or silicon nitride $SiN_x$. The thermal conductivity of the substrate 100 may be larger than that of the optical waveguide film 101. For example, when the substrate 100 and the optical waveguide film 101 respectively include silicon and silica, the thermal conductivity of the substrate 100 may be about 168 W/(m·K), and the thermal conductivity of the optical waveguide film 101 may be about 1.4 W/(m·K).

The optical waveguide film 101 may include optical waveguides and optical couplers extending in the first direction D1. The optical waveguides may have any one shape among, for example, a buried channel waveguide, a ridge waveguide, a rib waveguide, and a strip-loaded waveguide. In the cross-sectional views below, the optical waveguides are exemplarily shown as buried channel waveguides, but the inventive concept is not limited thereto. The optical waveguides may have various shapes. The optical couplers may be provided on paths that the optical waveguides extend. The optical couplers may have any one type among a Y-branch splitter, a directional coupler, or a multi-mode interferometer. Each of the optical waveguides may include a signal input waveguide 110 and a local input waveguide 120. The signal input waveguide 110 and the local input waveguide 120 may extend in the first direction D1 on the optical waveguide film 101.

The coherent optical receiver 10 according to an embodiment of the inventive concept may include a first circuit element VOA, a second circuit element PBS, and third optical circuit elements OH1 and OH2, which are sequentially provided in the first direction D1 on the substrate 100. The first optical circuit element VOA may be a variable optical attenuator. In addition, the second optical circuit element PBS may be a polarization beam splitter. Furthermore, the third optical circuit elements OH1 and OH2 may be optical hybrids. The first optical circuit element VOA and the second optical circuit element PBS may have a Mach-Zehnder interferometer structure. The first optical circuit element VOA may be provided in a first area A. The first optical circuit element VOA may be connected to the signal input waveguide 110. The second optical circuit element PBS may be provided in a second area B. The second area B may be separated from the first area A in the first direction D1. The second optical circuit element PBS may be connected to an output waveguide 113 that passes through the first optical circuit element VOA and the local input waveguide 120. Optical signals passing through the second optical circuit element PBS may be branched off according to polarization components. The second optical circuit element PBS and each of the third optical circuit elements OH1 and OH2 may be connected to each other through two optical waveguides. Optical signals having different polarization components may be input to each of the third optical circuit elements OH1 and OH2. The third optical circuit elements OH1 and PH2 may be separated from each other in the second direction D2. The third optical circuit elements OH1 and PH2 may output signals demodulated to an in-phase signal and a quadrature phase signal.

In addition, the coherent optical receiver 10 may include a trench DT in the first area A and a slit SL in the second area B. The trench DT and the slit SL may expose the substrate 100 under the optical waveguide film 101.

The fabrication method of the coherent optical receiver 10 according to an embodiment of the inventive concept may include a step for providing the substrate 100, and a step for forming the first optical circuit element VOA, the second optical circuit element PBS, and the third optical circuit elements OH1 and OH2 on the substrate 100. Here, the forming of the first optical circuit element VOA may include forming optical waveguides and the trench DT in both sides of the optical waveguides. In addition, the forming of the second optical circuit element PBS may include forming optical waveguides, the slit SL crossing the optical waveguides, and a wavelength plate WP inserted into the slit SL.

The trench DT and the slit SL may be formed through a process for sequentially etching a portion of the optical waveguide film 101 and a portion of the substrate 100. Here, the trench DT and the slit SL may be substantially simultaneously formed through the same process. The etching process may be performed by at least one process among an induced coupled plasma etching process and a deep reactive ion etching process. For example, the etching of the optical waveguide film 101 may be performed by the induced coupled plasma etching process, and the etching of the substrate 100 may be performed by the deep reactive ion etching process. The trench DT and the slit SL may be formed symmetrically with respect to internal center axes of the first optical circuit element VOA and the second optical circuit element PBS. Here, the center axis may be a virtual axis parallel to the first direction D1.

Hereinafter, the first optical circuit element VOA of the first area A and the second optical circuit element PBS of the second area B will be described in detail with reference to FIGS. 2 to 5.

Figure 2:
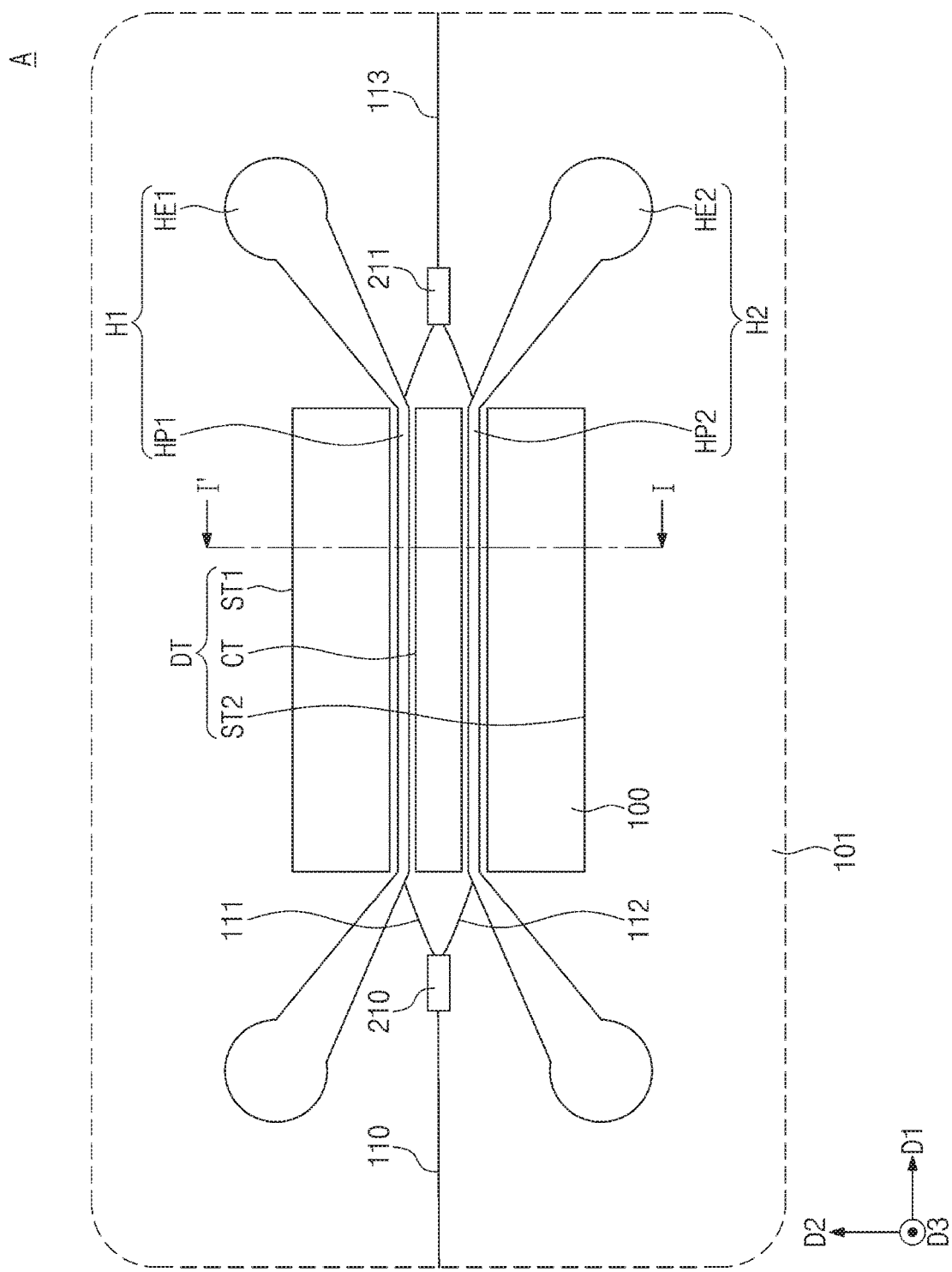
FIG. 2 is an enlarged view of area A of FIG. 1.
Figure 3:
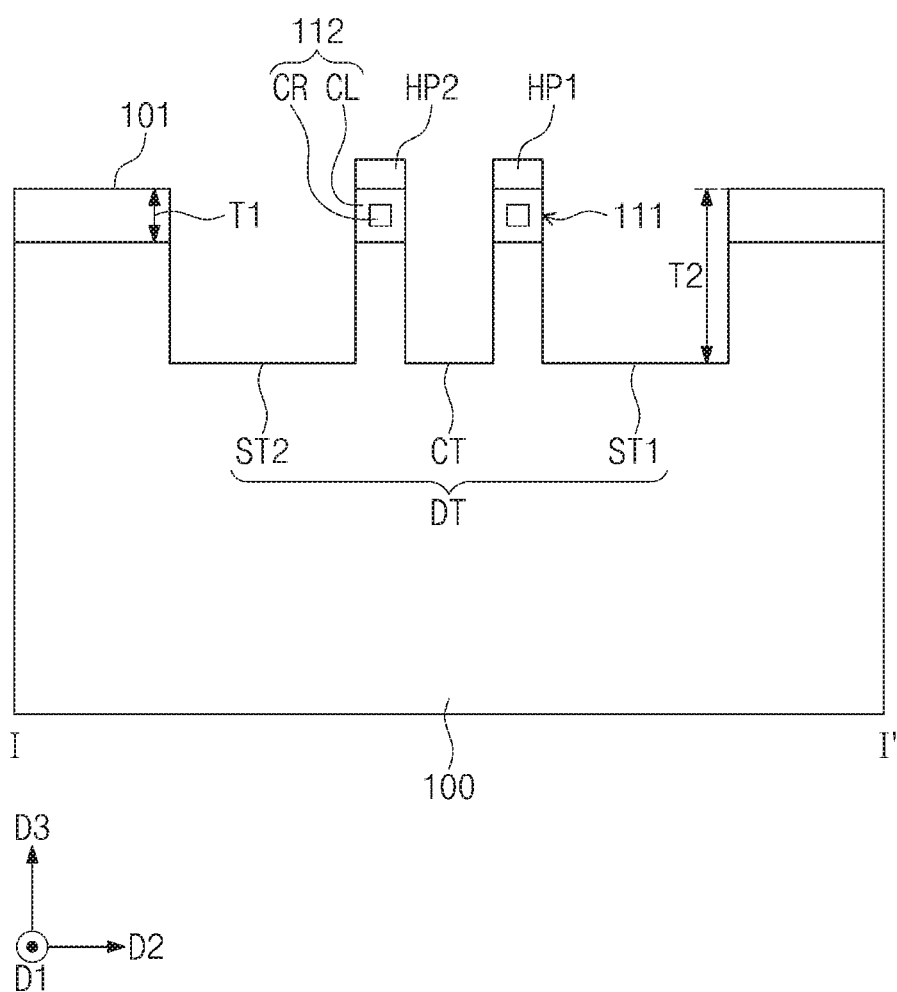
FIG. 3 is a cross-sectional view showing a cross section cut along line I-I' of FIG. 2.

FIG. 2 is an enlarged view of area A of FIG. 1. FIG. 3 is a cross-sectional view showing a cross section cut along line I-I' of FIG. 2.

Referring to FIGS. 2 and 3, a first optical waveguide may be provided to the first area A. The first optical waveguide may include the signal input waveguide 110, first and second optical couplers 210 and 211, first and second branch waveguides 111 and 112, and the output waveguide 113. The signal input waveguide 110 may extend in the first direction D1. The signal input waveguide 110 may be branched into the first and second branch waveguides 111 and 112 through the first optical coupler 210. The first and second branch waveguides 111 and 112 may be combined to the output waveguide 113 through the second optical coupler 211. The output waveguide 113 may extend in the first direction D1. From the perspective of the cross-sectional area according to FIG. 3, each of the first and second branch waveguides 111 and 112 may include a core CR and a cladding CL surrounding the core CR. Although not shown in the drawing, each of the signal input waveguide 110 and the output waveguide 113 may also include a core CR and a cladding CL surrounding the core CR. The refractive index of the core CR may be larger than the refractive index of the cladding CL. For example, a refractive index difference between the core CR and the cladding CL may be about 0.75% to about 3%.

In addition, first and second heating electrodes H1 and H2 may be provided which respectively include the first and second electrode units HE1 and HE2, and first and second heating units HP1 and HP2. The first electrode unit HE1 may be separated from the signal input waveguide 110 and the output waveguide 113 in the second direction D2. The second electrode unit HE2 may be separated from the signal input waveguide 110 and the output waveguide 113 in a direction opposite to the second direction D2. The first and second heating units HP1 and HP2 may respectively abut on top surfaces of the first and second branch waveguides 111 and 112. The widths of the first and second heating units HP1 and HP2 in the second direction D2 may be larger than or equal to those of the first and second branch waveguides 111 and 112 in the second direction D2. A voltage may be selectively applied to the first electrode unit HE1 or the second electrode unit HE2 to selectively heat the first heating unit HP1 and the second heating unit HP2. Accordingly, the heat from the first heating unit HP1 or the second heating unit HP2 may be delivered to the first branch waveguide 111 or the second branch waveguide 112. An effective refractive index of the first branch waveguide 111 or the second branch waveguide 112 may be changed by heat energy due to the heating. The effective refractive index of any one between the first and second branch waveguides 111 and 112 may be changed to generate a phase difference. The phase difference between the first and second branch waveguides 111 and 112 may attenuate an output light intensity compared to an input light intensity.

In addition, the trench DT may be provided to a portion of the first area A. The trench DT may include first and second side trenches ST1 and ST2 and a center trench CT. The first side trench ST1 may be provided in a side of the first branch waveguide 111, which faces the second direction D2. The second side trench ST2 may be provided in a side of the second branch waveguide 112, which faces the opposite direction of the second direction D2. The center trench CT may be provided between the first and second branch waveguides 111 and 112. The first and second side trenches ST1 and ST2 may be symmetric with respect to the center trench CT. The depth T2 of the trench DT in the third direction D3 may be larger than the thickness T1 of the optical waveguide film 101 in the third direction D3. For example, the thickness T1 of the optical waveguide film 101 in the third direction D3 may be about 5 μm to about 30 μm. In addition, the depth T2 of the trench DT in the third direction D3 may be about 50 μm to about 500 μm. The depths T2 of the first and second trenches ST1 and ST2 and the depth T2 of the center trench CT in the third direction D3 may be substantially the same. The trench DT may expose the substrate 100 under the optical waveguide film 101 to the outside. Although not shown in the drawing, additional trenches may be provided respectively to a space separated from the first side trench ST1 in the second direction D2 and a space separated from the second side trench ST2 in the direction opposite to the second direction D2.

The trench DT may be provided in both sides of the first and second branch waveguides 111 and 112 to make a thermal insulation effect of air large. More specifically, when compared with a case in which the trench DT is not provided, heat may be reduced which is delivered from the first and second heating units HP1 and HP2 to the substrate 100 and a portion of the optical waveguide film 101 in the sides of the first and second branch waveguides 111 and 112. In other words, the heat may be efficiently delivered from the first and second heating units HP1 and HP2 to the first and second branch waveguides 111 and 112. As a result, a power consumption amount for increasing temperatures of the first and second branch waveguides 111 and 112 may be reduced. In addition, the trench DT may mitigate stress generated in the waveguide film. Accordingly, the polarization dependence of the first optical circuit element VOA may be minimized.

Figure 4:
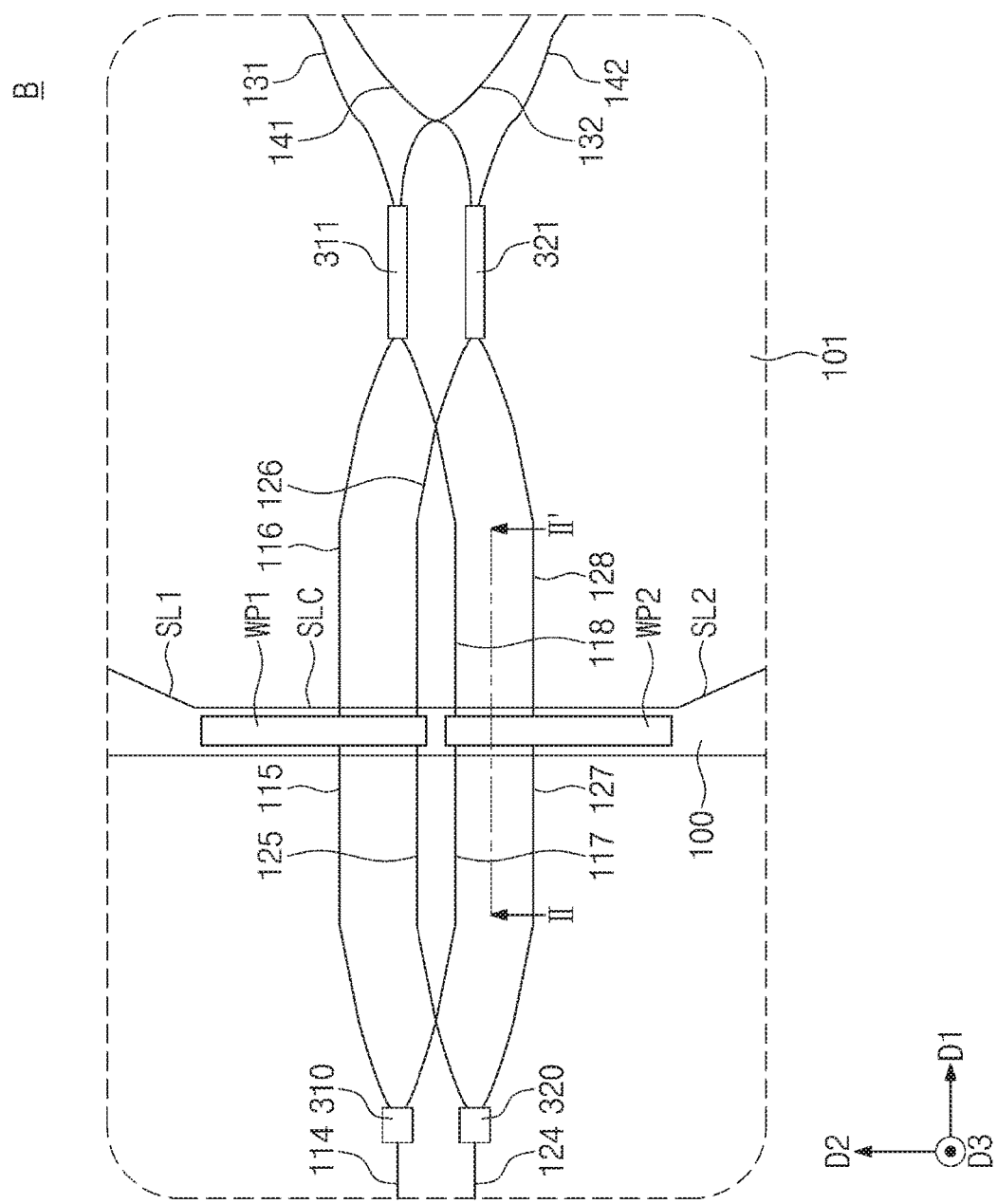
FIG. 4 is an enlarged view of area B of FIG. 1.
Figure 5:
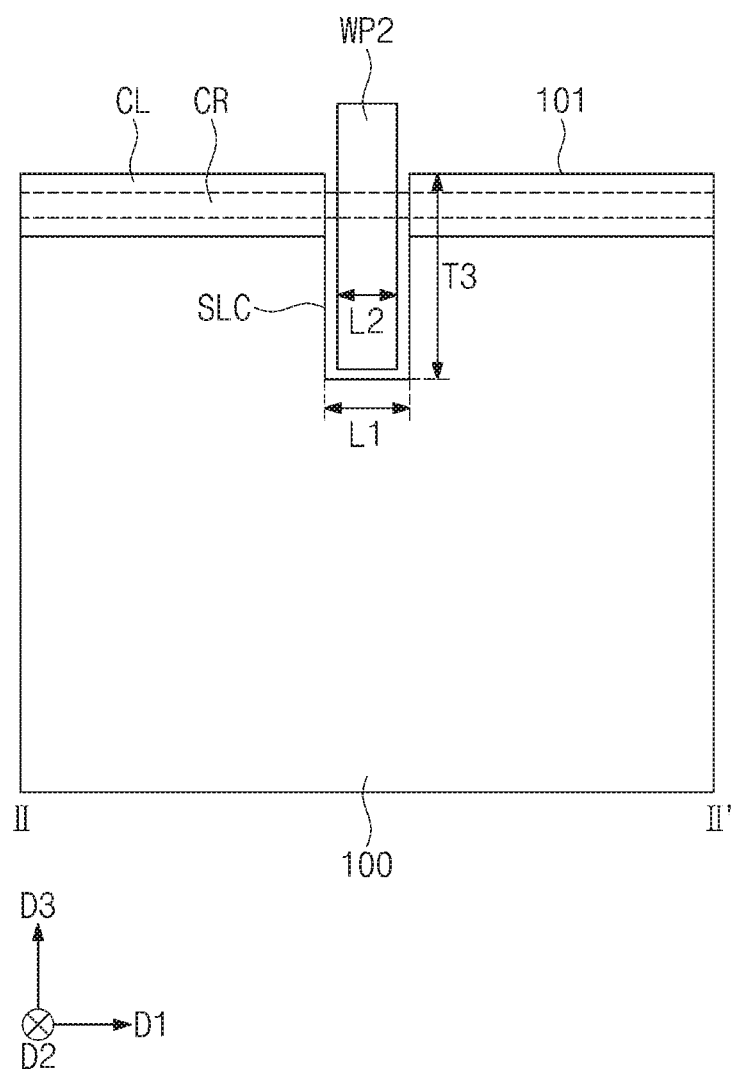
FIG. 5 is a cross-sectional view showing a cross section cut along line II-IF of FIG. 4.

FIG. 4 is an enlarged view of area B of FIG. 1. FIG. 5 is a cross-sectional view showing a cross section cut along line II-IF of FIG. 4.

Referring to FIGS. 4 and 5, a second optical waveguide may be provided in the second area B. The second optical waveguide may include first and second input waveguides 114 and 124, first and second input couplers 310 and 320, first to fourth input branch waveguides 115, 117, 125, and 127, first to fourth output branch waveguides 116, 118, 126, and 128, first and second output couplers 311 and 321, and first to fourth output waveguides 131, 132, 141 and 142. The first input waveguide 114 may be connected to the output waveguide 113 illustrated in FIGS. 1 and 2. The second input waveguide 124 may be connected to the local input waveguide 120 illustrated in FIG. 1. The first and second input waveguides 114 and 124 may extend in the first direction D1. The first and second input couplers 310 and 320 may receive one optical signal and output two optical signals. The first and second input couplers 310 and 320 may be a 1×2 multi-mode interference coupler or a 1×2 optical splitter. The first and second output couplers 311 and 321 may receive two optical signals and output two optical signals. The first and second output couplers 311 and 321 may be a 2×2 multi-mode interference coupler or a 2×2 directional coupler.

In addition, the slit SL (see FIG. 1) may be provided in a portion of the second area B. The slit SL may include first and second side slits SL1 and SL2, and a center slit SLC. The first and second side slits SL1 and SL2 may be separated from each other in the second direction D2 with the center slit SLC interposed therebetween. The first side slit SL1 may have the width increasing in the first direction D1 as it goes in the second direction D2. The second side slit SL2 may have the width increasing in the first direction D1 as it goes in a direction opposite to the second direction D2. The center slit SLC may become perpendicular to the first to fourth input branch waveguides 115, 117, 125 and 127, and the first to fourth output branch waveguides 116, 118, 126 and 128. The center slit SLC may extend in parallel to the second direction D2. The width of the center slit SLC may be constant in the first direction D1. For example, the width L1 of the center slit SLC in the first direction D1 may be about 8 μm to about 30 μm. Furthermore, for example, the depths T3 of the first and second side slits SL1 and SL2 and the center slit SLC in the third direction D3 may be about 50 μm to about 500 μm. For example, the depth T3 of the center slit SLC in the third direction D3 may be smaller than that T2 (in FIG. 3) of the trench DT (in FIG. 3). Although not shown in the drawing, spot size converters SSC may be provided between the center slit SLC and the first to fourth input branch waveguides 115, 117, 125 and 127 and between the center slit SLC and the first to fourth output branch waveguides 116, 118, 126 and 128. The SSCs may include cores. The SSC may prevent occurrence of optical reflection or an optical loss in an optical signal deliver process.

The first and second wavelength plates WP1 and WP2 may be inserted into the center slit SLC. For example, the first and second wavelength plates WP1 and WP2 may be ½ λ wavelength plates (HWP) or ¼ λ wavelength plate (QWP). The first and second wavelength plates WP1 and WP2 may be inserted in parallel to the second direction D2. The first wavelength plate WP1 may be inserted to be perpendicular to the first and third input branch waveguides 115 and 125. The second wavelength plate WP2 may be inserted to be perpendicular to the second and fourth input branch waveguides 117 and 127. The first and second wavelength plates WP1 and WP2 may be separated from each other in the second direction D2. The width L2 of the first and second wavelength plates WP1 and WP2 in the first direction D1 may be smaller than the width L1 of the center slit SLC in the first direction DE For example, the widths L2 of the first and second trenches WP1 and WP2 in the first direction D1 may be about 5 μm to about 20 μm. Accordingly, the first and second wavelength plates WP1 and WP2 may be separated from the side walls of the center slit SLC. In addition, in the first and second side slits SL1 and SL2, the widths becomes large in the first direction D1, as they go in the second direction D2 and the opposite direction to the second direction D2. Accordingly, it may be easier to insert the first and second wavelength plates WP1 and WP2. The lengths of the first and second wavelength plates WP1 and WP2 in the third direction D3 may be larger than the depth T3 of the center slit SLC in the third direction D3. Accordingly, the first and second wavelength plates WP1 and WP2 may protrude above the top surface of the optical waveguide film 101. However, unlike the illustrated case, only one wavelength plate may be inserted into the center slit SLC.

The optical signal in the first input waveguide 114 may be branched into first and second input branch waveguides 115 and 117 through the first input coupler 310. The optical signals in the first and second input branch waveguides 115 and 117 may pass through the center slit SLC. In addition, the optical signal in the second input waveguide 124 may be branched into the third and fourth input branch waveguides 125 and 127 through the second input coupler 320. The optical signals in the third and fourth input branch waveguides 125 and 127 may pass through the center slit SLC.

The optical signals passing through the center slit SLC may include a first polarization component and a second polarization component. For example, the first polarization component may be a transverse electric (TE) component, and the second polarization component may be a transverse magnetic (TM) component. The first and second wave plates WP1 and WP2 may change a phase of a specific polarization component in the optical signals passing through the center slit SLC. In other words, the first and second wave plates WP1 and WP2 may be birefringent media. For example, the first wavelength plate WP1 may have a first optical axis, and the second wavelength plate WP2 may have a second optical axis having an angular difference of 90 degrees with the first optical axis. The phase of the first polarization component of the optical signal passing through the first wave plate WP1 may be delayed by 90 degrees. The phase of the second polarization component of the optical signal passing through the second wave plate WP2 may be earlier by 90 degrees. In other words, the first polarization component passing through the first wavelength plate WP1 and the second polarization component of the optical signal passing through the second wavelength plate WP2 may have the phase difference of total 180 degrees. The first and second output couplers 311 and 321 may separate the first polarization component and the second polarization component according to the phase difference.

Specifically, the optical signals of the first and third input branch waveguides 115 and 125 may pass through the first wavelength plate WP1 to be output to the first and third output branch waveguides 116 and 126 with the phase of the first polarization component delayed by 90 degrees. The optical signals of the second and fourth input branch waveguides 117 and 127 may pass through the second wavelength plate WP2 to be output to the second and fourth output branch waveguides 118 and 128 with the phase of the second polarization component earlier by 90 degrees. The optical signals in the first and second output branch waveguides 116 and 118 may be input to the first output coupler 311. The first output coupler 311 may output the optical signals to the first and second output waveguides 131 and 132. In addition, the optical signals in the third and fourth output branch waveguides 126 and 128 may be input to the second output coupler 321. The second output coupler 321 may output the optical signals to the third and fourth output waveguides 141 and 142. For example, the optical signals output to the first and third output waveguides 131 and 141 may have the first polarization component, and the optical signals output to the second and fourth output waveguides 132 and 142 may have the second polarization component. The third output waveguide 141 may extend in the same direction as the first output waveguide 131. In addition, the fourth output waveguide 142 may extend in the same direction as the second output waveguide 132.

Figure 6:
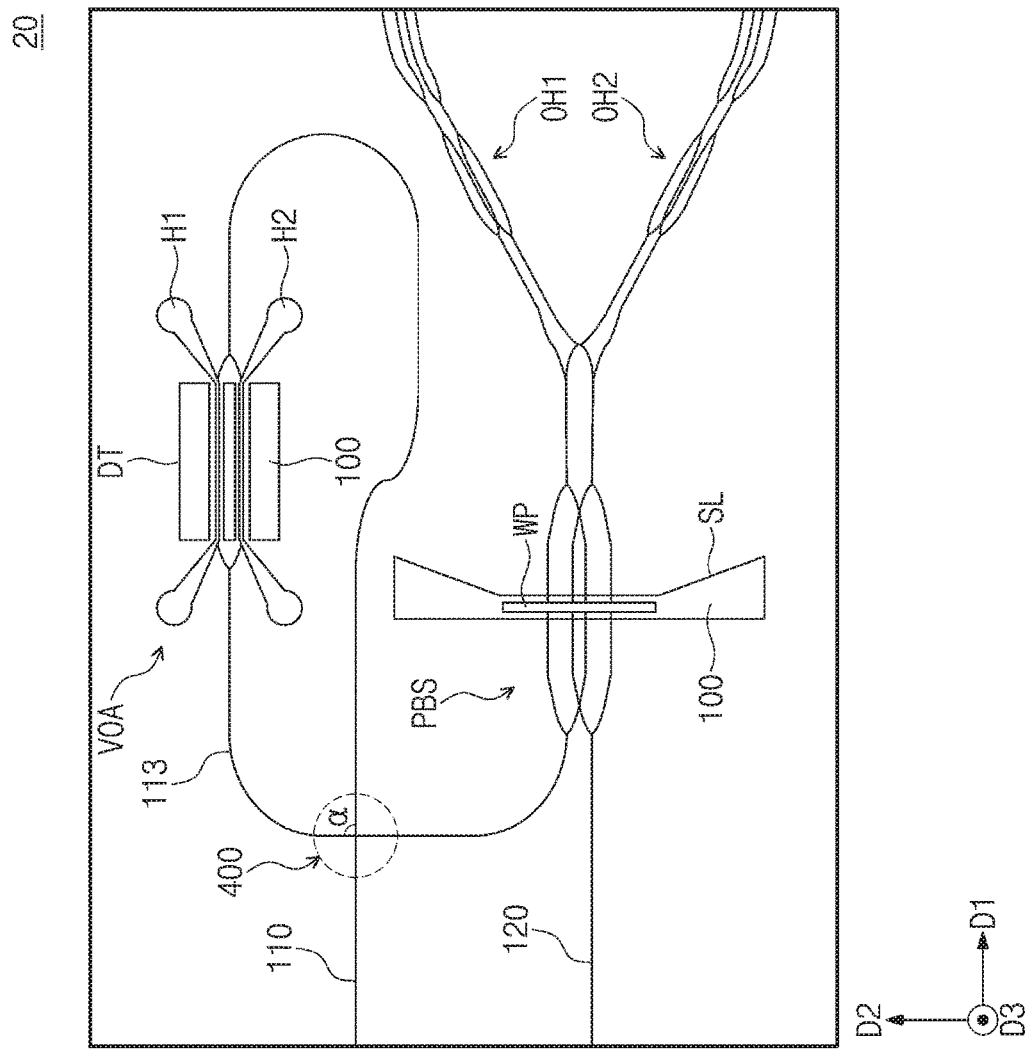
FIG. 6 is a plane view for explaining a coherent receiver according to another embodiment of the inventive concept.

FIG. 6 is a plane view for explaining a coherent receiver according to another embodiment of the inventive concept.

Referring to FIG. 6, in the coherent optical receiver 20 according to the other embodiment of the inventive concept, the first optical element VOA and the second optical circuit element PBS may overlap in the second direction D2. Accordingly, the length of the coherent optical receiver 20 in the first direction D1 may be smaller.

As the first optical circuit element VOA and the second optical circuit element PBS overlap in the second direction D2, a crosspoint 400 may be generated between the signal input waveguide 110 and the output waveguide 113 connected to the first optical circuit element VOA. At the crosspoint 400, a crossing angle α between the signal input waveguide 110 and the output waveguide 113 may be about 35 degrees to about 90 degrees. When the crossing angle α is maintained at about 35 degrees to about 90 degrees, crosstalk between the signal input waveguide 110 and the output waveguide 113 may be maintained sufficiently low. Furthermore, although not shown in the drawing, SSCs may be respectively provided to the signal input waveguide 110 and the output waveguide 113, which are adjacent to the crosspoint 400, in order to lower an optical loss at the crosspoint 400.

Although the exemplary embodiments of the present invention have been described, it is understood that the present invention may be implemented as other concrete forms without changing the inventive concept or essential features. Therefore, these embodiments as described above are only proposed for illustrative purposes and do not limit the present disclosure.

According to the embodiments of the present disclosure, the coherent optical receiver, in which a plurality of optical circuit elements with various functions are monolithically integrated in one substrate, does not require optical arrangement, which results in simple packaging, low cost, and reduction in size.

In addition, the coherent receiver according to the embodiments of the present disclosure may minimize polarization dependence of the variable optical attenuator and lower power consumption by means of a trench. The coherent receiver may also allow the polarization beam splitter to have a high polarization extinction ratio by means of a wavelength plate inserted into a slit.

In addition, the fabrication method of the coherent optical receiver according to the embodiments of the present disclosure may form the trench and slit substantially simultaneously to reduce processing steps and stably secure the performance of each optical circuit element.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A coherent optical receiver comprising:
a substrate;
signal and local input waveguides extending in a first direction parallel to a top surface of the substrate and configured to receive an optical signal;
a first optical circuit element comprising a first optical waveguide connected to the signal input waveguide and a trench provided in one side of the first optical waveguide in parallel to the first direction;
a second optical circuit element comprising a second optical waveguide connected to the first optical waveguide, a slit crossing the second optical waveguide, and a wavelength plate inserted into the slit; and
third optical circuit elements connected to the second optical circuit element,
wherein the first to third optical circuit elements are monolithically integrated in the substrate, and
wherein depths of the trench and the slit are larger than a thickness of the first optical waveguide and a thickness of the second optical waveguide.

2. The coherent optical receiver of claim 1, wherein the trench and the slit are configured simultaneously in a same process.

3. The coherent optical receiver of claim 1, wherein the second optical waveguide of the second optical circuit element are connected to the local input waveguide.

4. The coherent optical receiver of claim 1, wherein each of the depths of the trench and the slit is about 50 μm to about 500 μm.

5. The coherent optical receiver of claim 1, wherein the substrate contains silicon, and the first and second optical waveguides contains silica (SiO2) or silicon nitride (SiNx).

6. The coherent optical receiver of claim 1,
wherein the first optical waveguide comprises first and second branch waveguides,
wherein the first and second branch waveguides are separated from each other in a second direction perpendicular to the first direction, and
the trench comprises a center trench between the first and second branch waveguides and side trenches in outer sides of the first and second branch waveguides.

7. The coherent optical receiver of claim 6, wherein the side trenches are symmetric with respect to the center trench.

8. The coherent optical receiver of claim 6, wherein the first optical circuit element further comprises heating electrodes,
wherein each of the heating electrodes overlaps the first branch waveguide or the second branch waveguide in a direction vertical to the top surface of the substrate.

9. The coherent optical receiver of claim 8, wherein widths of the heating electrodes in the second direction are larger than or equal to widths of the first and second branch waveguides in the second direction.

10. The coherent optical receiver of claim 1, wherein the slit comprises:
a first side slit having a width that becomes larger in a second direction perpendicular to the first direction;
a second side slit having a width that becomes larger in an opposite direction to the second direction; and
a center slit perpendicular to the second optical waveguide between the first and second side slits, wherein
the center slit has a first width in the first direction,
the wavelength plate has a second width in the first direction, and
the first width is larger than the second width.

11. The coherent optical receiver of claim 10,
wherein the first width is about 8 μm to about 30 μm, and the second width is about 5 μm to about 20 μm.

12. The coherent optical receiver of claim 1,
wherein the first to third optical circuit elements are sequentially provided in the first direction, and
the third optical circuit elements are separated from each other in a second direction perpendicular to the first direction.

13. The coherent optical receiver of claim 1, wherein the first and second optical circuit elements are separated from each other in a second direction perpendicular to the first direction, and have a crosspoint between the first optical waveguide and the second optical waveguide.

14. The coherent optical receiver of claim 13, wherein a crossing angle between the first optical waveguide and the second optical waveguide at the crosspoint is about 35 degrees to about 90 degrees.

15. The coherent optical receiver of claim 1, wherein the wavelength plate comprises a ½λ wavelength plate (HWP) or a ¼λ wavelength plate (QWP).

16. A fabrication method of a coherent optical receiver, the fabrication method comprising:
providing a substrate; and
providing first, second, and third optical circuit elements on the substrate,
wherein the providing of the first optical circuit element comprises providing a first optical waveguide and a trench in both sides of the first optical waveguide, and
the providing of the second optical circuit element comprises: providing a second optical waveguide and a slit crossing the second optical waveguide; and inserting a wavelength plate into the slit,
wherein the providing of the trench of the first optical circuit element and the slit of the second optical circuit element comprises: providing an optical waveguide film on the substrate; and sequentially etching a portion of the optical waveguide film and a portion of the substrate, and
wherein the trench and the slit are provided simultaneously.

17. The fabrication method of claim 16, wherein the providing of the trench and the slit is performed through at least any one process among an induced coupled plasma etching process and a deep reactive ion etching process.

18. The fabrication method of claim 16,
wherein the first optical waveguide comprises first and second branch waveguides,
the trench comprises a center trench between the first and second branch waveguides and side trenches in outer sides of the first and second branch waveguides, and
the side trenches are symmetric with respect to the center trench.

19. The fabrication method of claim 16,
wherein the slit is perpendicular to the second optical waveguide, and
the wavelength plate is inserted into the slit so as to be perpendicular to the second optical waveguide.

20. The fabrication method of claim 16,
wherein the first and the second optical waveguides are configured to cross at a crosspoint, and
a crossing angle at the crosspoint is about 35 degrees to about 90 degrees.

* * * * *